Figure 1:
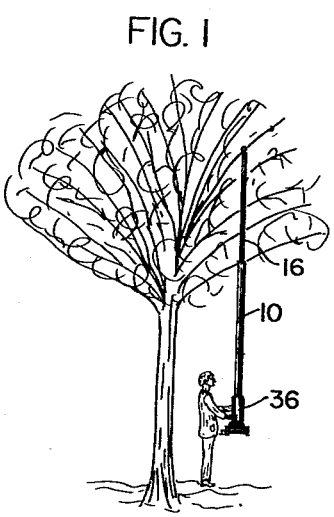

May 12, 1964

L. C. RUSSELL ETAL 3,132,458

PORTABLE NUT TREE SHAKER

Filed May 8, 1962

INVENTOR
EZRA M. DOWLING
CARROLL RUSSELL

BY

ATTORNEY

within the lower member and projectable and retractable relative thereto. The upper member is provided with a hook for engaging the limbs of a tree and such hook is connected by a cable to a reel at the bottom of the device. The lower portion of the device is provided with a bumper and a movable sleeve adapted to strike the bumper. The cable transmits the resulting shock upwardly to the hook which in turn shakes the limb which it is engaging and causes the ripe fruit thereon to fall by gravity.

3,132,458
PORTABLE NUT TREE SHAKER
Lorenzo Carroll Russell and Ezra M. Dowling, Blackshear, Ga.
Filed May 8, 1962, Ser. No. 193,212
1 Claim. (Cl. 56—328)

This invention relates to the harvesting of crops of various kinds including those which are tree-grown, and to devices and equipment by which the harvesting of such crops is accelerated, simplified, facilitated and made considerably easier.

The invention relates particularly to the harvesting of pecans and other tree-grown crops of various kinds having nuts or other fruit located at a substantial height above the ground and normally out of reach, and rendering it desirable to have equipment by which the harvested products can be reached or detached for subsequent collection.

Devices of various kinds have been employed to facilitate the harvesting of products including percans and other tree-grown products however these have not been satisfactory due to the lack of efficiency, the cost measured both in time and material, and possible injury to the product or to the trees or plants on which they are produced. Such devices have presented problems, some being too heavy to handle while others did not accomplish the purpose desired.

It is an object of the invention to provide a relatively lightweight portable nut tree shaker which can be readily handled by an individual including movement from place to place and by the use of which nuts can be readily shaken from the trees without the necessity of climbing the trees avoiding the danger of injury to the person with possible destruction of limbs, as well as being a great time saver, and capable of use in reaching limbs in a normally inaccessible location onto which a climber could not venture, as well as a tree shaker of lightweight capable of being used by a woman to shake trees and gather nuts without the help of men.

A further object of the invention is to provide a simple, inexpensive nut tree shaker of metal, Fiberglas, or other suitable material, which can be compactly disposed for transportation or storage and extended to varying lengths as required in use and with a reel to reduce the amount of effort required, as well as a hammer by which jars can be imparted and transferred to the limbs of the trees through a cable.

Figure 2:
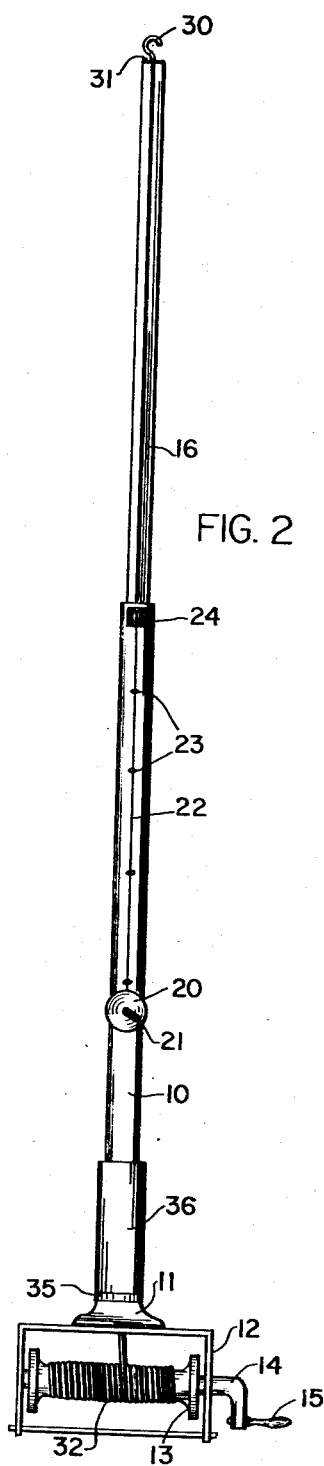
Figure 3:
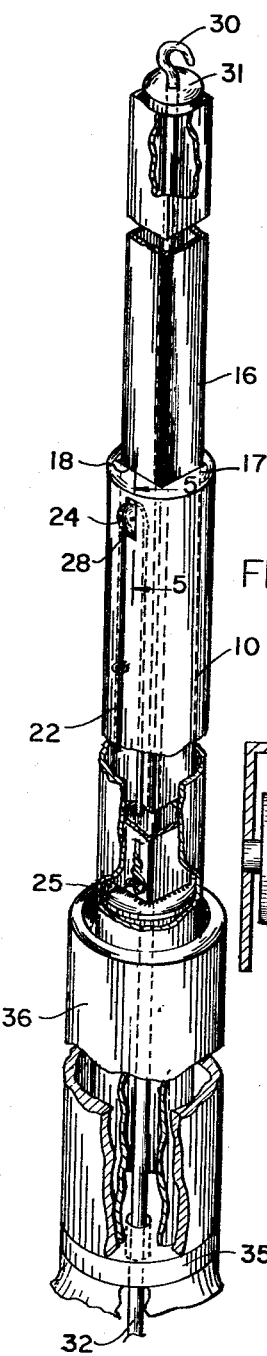
Figure 4:
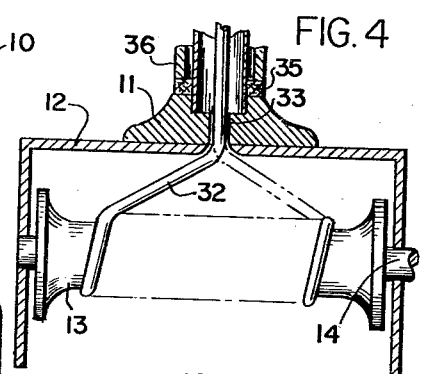

Other objects and advantages of the invention will be apparent from the following description taken in conjunction with the accompanying drawing in which:

FIG. 1 is an elevational view illustrating one application of the invention;

FIG. 2, an enlarged side elevation;

FIG. 3, an enlarged detail perspective with portions broken away for clarity;

FIG. 4, an enlarged vertical section of the lower portion of the device; and

Figure 5:
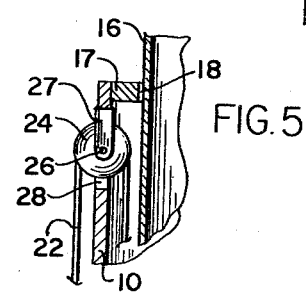

FIG. 5, an enlarged vertical section along the line 5—5 of FIG. 3.

Briefly stated, the present invention comprises a portable tree shaker for removing the fruit from trees without danger to the operator and without damage to the trees. The tree shaker includes upper and lower members with the upper member being telescopically received within the lower member and projectable and retractable relative thereto. The upper member is provided with a hook for engaging the limbs of a tree and such hook is connected by a cable to a reel at the bottom of the device. The lower portion of the device is provided with a bumper and a movable sleeve adapted to strike the bumper. The cable transmits the resulting shock upwardly to the hook which in turn shakes the limb which it is engaging and causes the ripe fruit thereon to fall by gravity.

With continued reference to the drawing, a portable shaker for nut and other fruit trees is provided comprising a hollow tubular lower member 10 connected at its lower extremity to a coupling 11 mounted on an inverted U-shaped frame 12. Such frame is adapted to support a reel 13 mounted on a shaft 14, one end of which terminates in an operating crank 15.

An upper member 16 which may be generally square in cross section is telescopically received within the lower member 10. A cap 17 having a square opening 18 is provided on the upper end of the member 10 and such cap slidably receives the upper member 16 in a manner to prevent rotation thereof.

In order to move the upper member outwardly of the lower member, the lower member is provided with a winding reel 20 having an operating crank or handle 21 and such reel is adapted to receive a wire or cord 22. The cord 22 extends upwardly from the reel 20 through a plurality of guides 23, over a pulley 24 and down the interior of the lower member 10 where it is connected to an eye 25 on the lower end of the upper member 16. The pulley 24 is rotatably mounted on a pin 26 carried by a bracket 27 fixed to the member 10 within an opening 28 to permit such cord to pass through the lower member.

A plate 31 is mounted on the free end of the upper member 16 and such plate supports an outwardly extending hook 30 on one side and is connected to a cable 32 on the opposite side. The cable 32 extends downwardly through the upper and lower members and through an opening 33 in the coupling 11 and is wound upon the reel 13. In order to shake the limb of the tree which is engaged by the hook 30, a bumper 35 of fibrous or other material is fixed to the coupling 11 about the lower member 10 and a hammer forming sleeve 36 is mounted about the lower member 10 and is adapted to be raised and lowered rapidly to exert a striking force against the bumper 35. The reels 13 and 20 may be provided with any well known means for securing them in fixed position.

In the operation of the device the upper portion 16 is adapted to be extended by operating the reel 20 to wind the cord 22 thereon and extend the upper portion outwardly of the lower portion any desired amount. When the upper portion has been sufficiently extended, the hook 30 at the upper end thereof engages the limb of a tree from which it is desired to remove the fruit. After the hook has engaged the limb, the cable 32 is tightened about the reel 13 and then the sleeve 36 is raised and brought sharply down against the bumper 35. The shock created by the striking of the sleeve 36 against the bumper 35 is transmitted through the cable 32 upwardly to the hook 30 and by the hook 30 to the limb of the tree which in turn shakes the limb to remove any fruit therefrom.

It will be obvious to one skilled in the art that various changes may be made in the invention without departing from the spirit and scope thereof and therefore the invention is not limited by that which is illustrated in the draw-

What is claimed is:

A portable tree shaker comprising a first member, a second member connected to said first member in telescopic relation thereto, a plurality of spaced winding reels mounted on said first member, cables connecting each of said reels to said second member, a limb-engaging hook on the free end of said second member, a bumper mounted adjacent the free end of said first member and a tubular hammer slidably engaging said first member whereby a tree limb may be engaged by said hook and given a shaking action by reciprocating said hammer against said bumper.

References Cited in the file of this patent

UNITED STATES PATENTS

| | | |
|---|---|---|
| 249,057 | Johnson | Nov. 1, 1881 |
| 256,587 | Newton | Apr. 18, 1882 |
| 791,704 | Lardner | June 6, 1905 |
| 2,542,665 | Gustafson | Feb. 20, 1951 |
| 2,808,676 | Major | Oct. 8, 1957 |
| 2,867,964 | Roberts | Jan. 13, 1959 |